United States Patent [19]
Boet

[11] Patent Number: 5,230,241
[45] Date of Patent: Jul. 27, 1993

[54] GROUND TESTING INSTALLATION FOR AN AIRCRAFT JET ENGINE HAVING A STEERABLE NOZZLE

[75] Inventor: Jean-Paul Boet, Villeneuve d'Ascq, France

[73] Assignee: S.A. André Boet, Villeneuve d'Ascq, France

[21] Appl. No.: 798,116

[22] Filed: Nov. 26, 1991

[30] Foreign Application Priority Data

Dec. 27, 1990 [FR] France .................. 90 16341

[51] Int. Cl.$^5$ .......................................... G01M 15/00
[52] U.S. Cl. ............................................. 73/116
[58] Field of Search .......... 73/116; 181/203, 213–222, 181/259, 262

[56] References Cited

U.S. PATENT DOCUMENTS

| | | | |
|---|---|---|---|
| 2,804,455 | 12/1958 | Hirschorn | 181/217 |
| 2,886,121 | 5/1959 | Welbourn | 181/42 |
| 3,205,705 | 9/1965 | Talley | 73/116 |
| 3,525,418 | 8/1970 | Smith et al. | 181/218 |
| 4,168,763 | 9/1979 | White et al. | 181/218 |
| 4,987,970 | 1/1991 | Boet | 181/217 |

FOREIGN PATENT DOCUMENTS

| | | |
|---|---|---|
| 1476529 | 2/1970 | Fed. Rep. of Germany . |
| 1284614 | 1/1962 | France . |
| 0346551 | 6/1988 | France . |
| 2633011 | 12/1989 | France . |

OTHER PUBLICATIONS

Lemmerman et al., "Aircraft Run-Up Silencing Design", *Noise Control*, vol. 2, No. 1, Jan. 1956, pp. 10–14, 65.

*Primary Examiner*—Robert Raevis
*Attorney, Agent, or Firm*—Fisher, Christen & Sabol

[57] ABSTRACT

A ground testing installation for an aircraft jet engine having a nozzle that is steerable relative to the longitudinal axis of said engine, the installation comprising:

a silencer having a body that is generally in the form of an elongate cylinder and intended to be disposed behind the nozzle of said engine; and a funneling device for funneling the jet of exhaust gases from the engine, which device is disposed between the engine and the silencer, said device comprising a generally cylindrical outer shell which flares in the vicinity of its end for facing the engine under test, and a generally cylindrical inner shell which is concentric with said outer shell and is intended to deflect the jet of exhaust gases when said jet or the nozzle of the engine under test is at some angle of inclination relative to the longitudinal axis of said engine.

According to the invention said inner shell comprises an outer wall and an inner wall, the inner wall extending over at least a portion of the periphery of said outer wall and over at least a major portion of its length, thereby defining between said walls a channel adapted to enable a cooling fluid to flow therealong.

11 Claims, 3 Drawing Sheets

GROUND TESTING INSTALLATION FOR AN AIRCRAFT JET ENGINE HAVING A STEERABLE NOZZLE

The present invention relates to a ground testing installation for an aircraft jet engine having a steerable nozzle, i.e. capable of steering its jet of gas relative to the longitudinal axis of the engine.

BACKGROUND OF THE INVENTION

Such an installation essentially comprises a silencer, generally in the form of an elongate cylindrical body disposed downstream from the engine which is to be tested on the ground, which silencer collects the exhaust gases from the engine, cools them, and dumps them into the atmosphere after attenuating the exhaust noise. A conventional silencer of this type is entirely suitable for conventional engines that eject their exhaust gases along the longitudinal axis of the engine.

However, manufacturers are currently developing a new generation of jet engines, i.e. engines whose outlet nozzles are steerable relative to the longitudinal axes of said engines. When the jet of gas from the engine, or when the nozzle of the engine under test, is at an angle relative to said longitudinal axis (so-called "vector" operation), the end portion of the silencer closest to the engine is exposed to very high temperatures, of about 2000° C., at least in the portion thereof which is struck directly by the jet of exhaust gases, and most conventional metals and alloys cannot withstand such temperatures.

Document FR-A-2 633 011 describes a solution to this problem, comprising a ground testing installation for an aircraft jet engine having a nozzle that is steerable relative to the longitudinal axis of said engine, the installation comprising:

- a silencer having a body that is generally in the form of an elongate cylinder and intended to be disposed behind the nozzle of said engine; and
- a funneling device for funneling the jet of exhaust gases from the engine, which device is disposed between the engine and the silencer, said device comprising a generally cylindrical outer shell which flares in the vicinity of its end for facing the engine under test, and a generally cylindrical inner shell which is concentric with said outer shell and is intended to deflect the jet of exhaust gases when said jet or the nozzle of the engine under test is at some angle of inclination relative to the longitudinal axis of said engine. More particularly, in that case, the inner shell includes a coil for conveying a flow of cooling fluid such as water, and extending generally along the cylinder generator lines formed by said inner shell. That solution provides satisfaction firstly, because of the effect of the inner shell, by the time the jet of exhaust gases from the engine reaches the silencer per se disposed downstream of said device in the flow direction of said jet, the jet is again at least substantially parallel to the longitudinal axis of the silencer and therefore does not run the risk of striking the walls thereof, and secondly, since the inner shell is cooled, there is no need to use special refractory materials to make said shell, e.g. ceramics that are heavy, fragile, and expensive, and the shell may be made merely of steel.

However, that solution that makes use of a forced flow of cooling fluid through a coil suffers from the drawback of requiring:

firstly the presence on the test site of a sufficient quantity and quality of cooling liquid such as water, for example; and secondly the installation of an assembly for treating and/or cooling the heated fluid leaving the coil.

An object of the present invention is to avoid the above drawback.

SUMMARY OF THE INVENTION

To this end, the invention provides an installation of the type specified above which is remarkable in that the inner shell comprises an outer wall and an inner wall, the inner wall extending over at least a portion of the periphery of said outer wall and over at least a major portion of its length, thereby defining between said walls a channel adapted to enable a cooling fluid to flow therealong.

Thus, firstly the inside wall of the inner shell serves to deflect the exhaust gas jet whenever the engine is performing vector operation during testing; and secondly the cooling fluid (in particular air) flowing through the channel defined between said inner and outer walls serves to cool the exhaust gas jet before it penetrates into the silencer per se.

Advantageously, said inner shell is open at both ends, such that cooling air can flow along said channel by being entrained during testing. This "natural" air flow avoids the drawbacks associated with a forced flow of fluid, e.g. the use of feed systems and relatively complex means for controlling the flow of cooling fluid.

Preferably, the inner wall of said inner shell is constituted by two diametrically opposite cylindrical wall portions each extending symmetrically about the middle vertical longitudinal plane of said inner shell. In particular, each of said cylindrical portions extends over an angle of about 35° on either side of said midplane, i.e. in the region which is most particularly likely to be struck by the exhaust gas jet of an engine performing "vector" operation.

To take account of thermal expansion, and for reasons of interchangeability, it is advantageous for each of said cylindrical portions to be subdivided into a plurality of longitudinal sections.

To facilitate assembly and disassembly, it is preferable for each of said cylindrical portions to be connected to the outer wall of the inner shell via longitudinal holding bars provided on either side of said cylindrical portion and via longitudinal beams fixed to said outer wall.

According to other characteristics of the invention, the outer shell and the outer wall of the inner shell are made of steel whereas said cylindrical portions are made of a temperature-resistant nickel alloy.

Moreover, to participate in deflecting the exhaust gas jet, the downstream end of the outer wall of the inner shell tapers.

Further, the flared end portion of said outer shell may be adapted to enable a cooling fluid to flow therethrough.

Advantageously, said silencer associated with said device for funneling the jet of exhaust gases is movable relative to the engine, thereby facilitating installation and facilitating finding the optimum operating position. Furthermore, the upstream end of the silencer relative to the flow direction of the jet of exhaust gases from the engine has an air suction chimney, and in operation, the downstream portion of said funnel device may be disposed beneath said chimney.

BRIEF DESCRIPTION OF THE DRAWINGS

The figures of the accompanying drawings show how the invention may be implemented. In the figures, identical references designate items that are similar.

DETAILED DESCRIPTION

Figure 1:
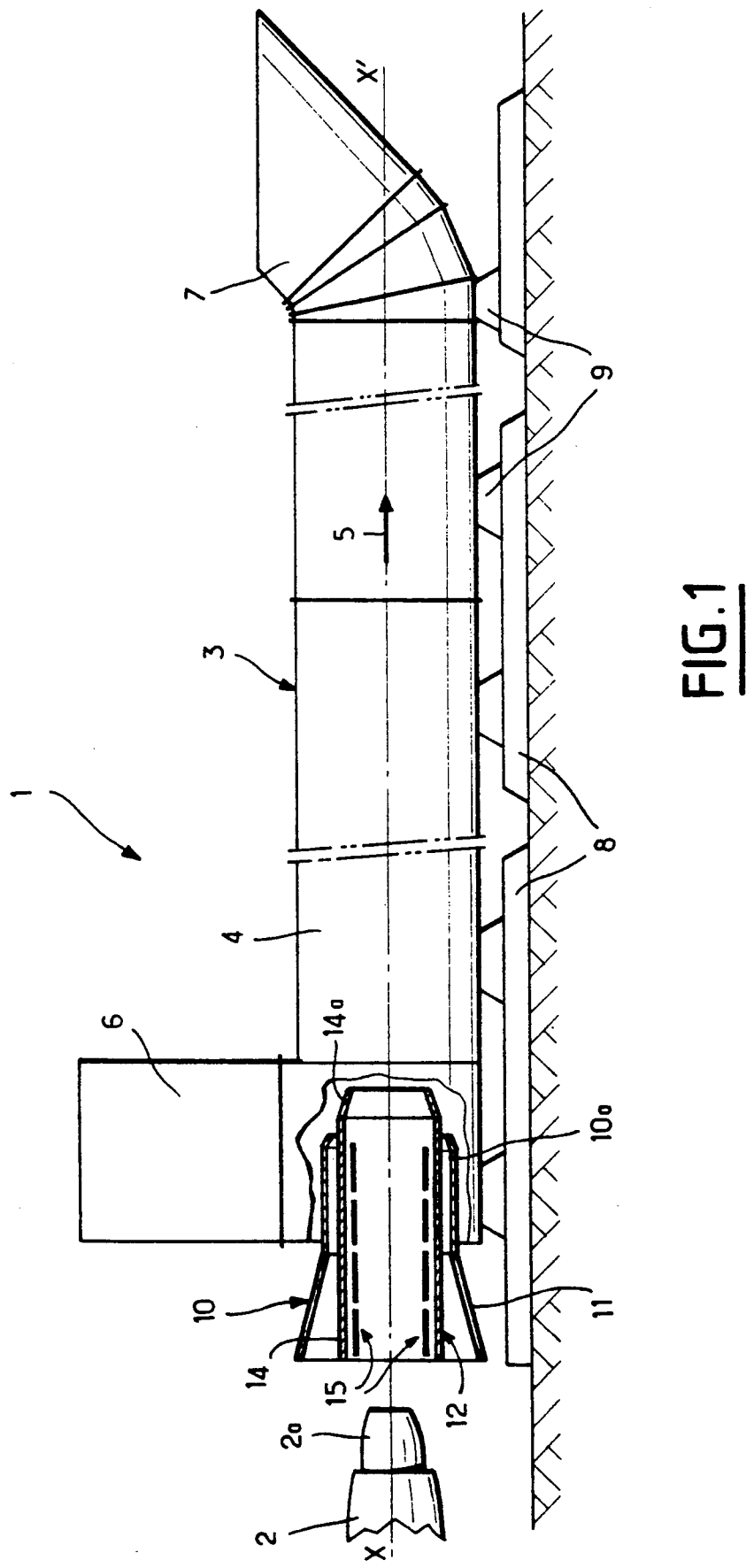
FIG. 1 is a partially cutaway diagrammatic view of a ground testing installation for an aircraft jet engine.

With reference to FIG. 1, a ground testing installation 1 for an aircraft jet engine 2 includes a silencer 3 having an elongate tubular body 4 that is generally cylindrical in shape and is disposed behind the engine 2 under test. The upstream end of the silencer 3 in the flow direction (arrow 5) of the exhaust gas jet from the engine 2 is provided, in the embodiment shown, with an air suction chimney 6. The downstream end of the silencer 3 is terminated by an upwardly curved portion 7 through which the cooled exhaust gases are dumped into the atmosphere. In addition, in this case, the silencer 3 is mounted to move on rails 8 via carriages 9.

Further, a jet-funneling device 10 is provided between the engine 2 and the silencer 3 for funneling the jet of exhaust gases from the engine 2, which engine has an outlet nozzle 2a that is steerable relative to the longitudinal axis X,X' of the engine. In operation, the downstream portion 10a of the device 10 is disposed beneath the chimney 6, as can be seen in FIG. 1.

Figure 2:
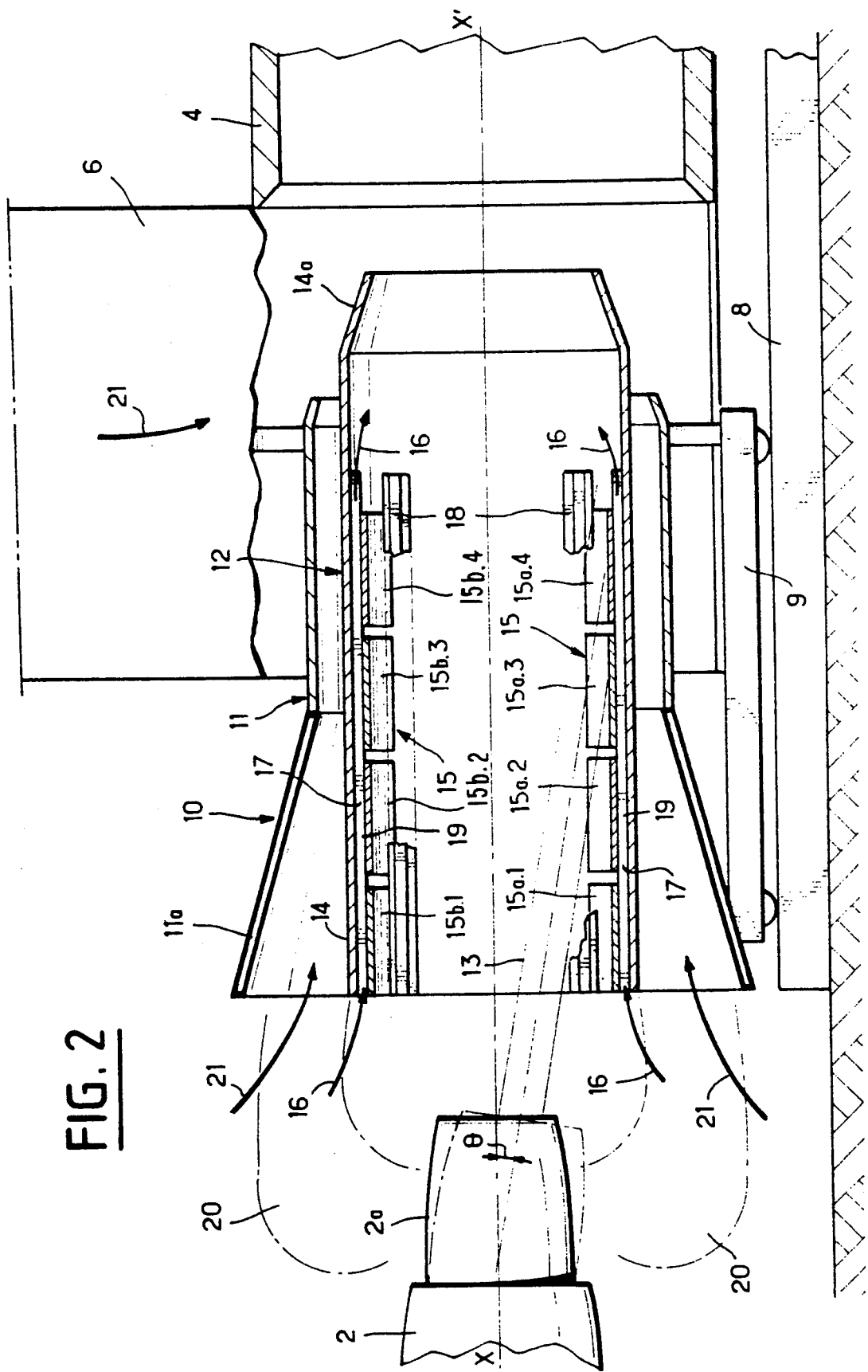
FIG. 2 is a diagrammatic longitudinal section view through the jet-funneling device of the invention.
Figure 4:
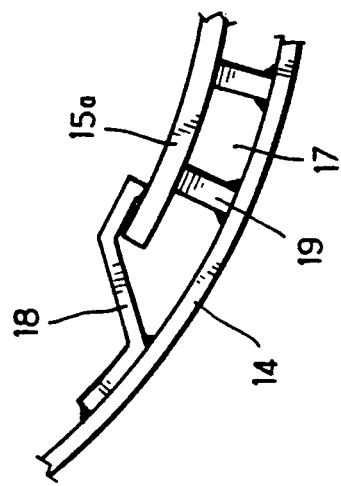
FIG. 4 shows a detail IV of FIG. 3 on a larger scale.

With reference more particularly to FIG. 2, the device 10 comprises an outer shell 11 that is generally cylindrical in shape and that flares towards its end 11a facing the engine 2 under test, together with an inner shell 12 which is also generally cylindrical in shape and which is concentric with the outer shell 11 (in operation the longitudinal axis of the outer and inner shells 11 and 12 advantageously coincides with the longitudinal axis X,X' of the engine 2), and intended to deflect the jet of exhaust gases 13 when said jet or the nozzle 2a of the engine under test 2 is at a certain angle of inclination $\theta$ relative to the longitudinal axis X,X' of the engine 2, which angle may be measured both in a vertical plane and in a horizontal plane. The outer and inner shells 11 and 12 are fixed relative to each other by any appropriate means (not shown).

Figure 3:
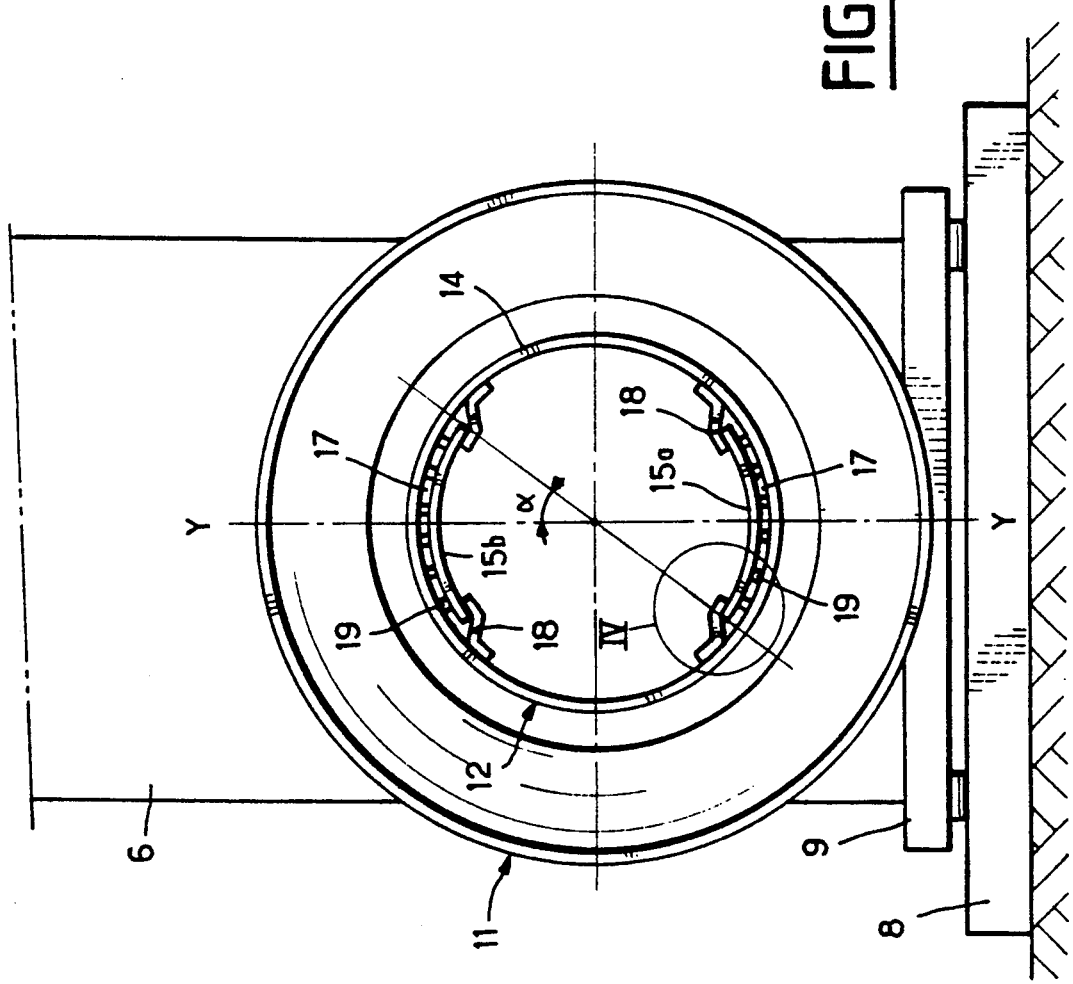
FIG. 3 is an end view of the FIG. 2 device.

In particular, according to the invention, the inner shell 12 comprises an inner wall 15 and an outer wall 14 that is cylindrical and concentric with the outer shell 11, and that has a tapering downstream end 14a in the flow direction of the exhaust gas jet 13. The inner shell 12 is open at both ends so cooling air (arrows 16) can be entrained during testing through the channel 17 defined between the outside wall 14 and the inside wall 15. As can be seen more clearly in FIG. 3, the inside wall 15 is constituted in this embodiment by two diametrically opposite wall portions or cylindrical plates 15a and 15b, each of which extends symmetrically on either side of the middle vertical longitudinal plane Y—Y of the inside shell 12, e.g. over an angle $\alpha$ of about 35°. It is only these wall portions 15a and 15b and their fixing means that come directly into contact with the hot jet during vector operation.

Moreover, as can be seen in FIG. 2, each of the cylindrical portions 15a and 15b is subdivided into a plurality of longitudinal sections 15a.1 to 15a.4, and 15b.1 to 15b.4. This makes it possible to take account of thermal expansion by providing clearance between the various sections and it also makes it possible to exchange one section only whenever that may be necessary without having to exchange the entire corresponding cylindrical portion.

Further, to facilitate installing and removing the cylindrical portions, they are slidably fixed to the outer wall 14 of the inner shell 12 by means of suitably shaped longitudinal holding bars 18 and longitudinal beams 19 fixed to the outer wall 14, in particular by welding.

The outer shell 11 and the outer wall 14 of the inner shell 12 may be made of steel, while the cylindrical portions 15a and 15b may be made of a temperature-resistant alloy of nickel, such as Inconel (registered trademark). In spite of the cooling obtained by the flow of air (arrows 16) through the channel 17, the cylindrical portions 15a and 15b may be raised to relatively high temperatures, and they must be capable of withstanding these temperatures.

Moreover, the flared end portion 11a of the outer shell 11 may be adapted to enable a cooling fluid to flow therethrough. This is particularly advantageous when the engine 2 is caused to operate during testing with thrust reversal, thereby providing hot jets 20 of exhaust gases. The outer shell 11 may then have a double envelope in this end portion 11a, or it may have one or more coils for a flow of cooling fluid.

During testing, when the nozzle 2a of the engine 2 is inclined at an angle $\theta$ relative to the longitudinal axis X,X', the inner shell 12 serves to deflect and cool the jet of exhaust gases 13 before it penetrates into the body 4 of the silencer per se 3. The cooling due to the cold air (arrows 16) entrained along the channel 17 is assisted by the cold air sucked in through the chimney 6 having the downstream portion 10a of the jet funneling device 10 disposed therebeneath in operation, and by the entrainment between the flared portion 11a of the outer shell 11 and the inner shell 12 (arrows 21). The deflected and cooled jet of exhaust gases 13 then passes through the body 4 of the silencer 3 and is dumped into the atmosphere via the curved portion 7 of the silencer 3 after the exhaust noise has been attenuated. The fact that the silencer 3 is movable also makes it possible to adapt the test installation 1 to particular types of engine (configuration, power, etc. . . . ).

I claim:

1. A ground testing installation for an aircraft jet engine having a nozzle that is steerable relative to the longitudinal axis of said engine, the installation comprising:

a silencer having a body that is generally in the form of an elongate cylinder and intended to be disposed behind the nozzle of said engine; and a funneling device for funneling the jet of exhaust gases from the engine, which device is disposed between the engine and the silencer, said device comprising a generally cylindrical outer shell which flares in the vicinity of its end for facing the engine under test, and a generally cylindrical inner shell which is concentric with said outer shell and is intended to deflect the jet of exhaust gases when said jet or the nozzle of the engine under test is at some angle of inclination relative to the longitudinal axis of said engine;

wherein said inner shell comprises an outer wall and an inner wall, the inner wall extending over at least a portion of the periphery of said outer wall and over at least a major portion of its length, thereby defining between said walls a channel adapted to enable cooling air to flow therealong, and wherein said inner shell is open at both ends, such that cooling air can flow along said channel by being entrained during testing.

2. An installation according to claim 1, wherein the inner wall of said inner shell is constituted by two diametrically opposite cylindrical wall portions, each extending symmetrically about the vertical longitudinal midplane of said inner shell.

3. An installation according to claim 2, wherein each of said cylindrical portions extends over an angle of about 35° on either side of said midplane.

4. An installation according to claim 2, wherein each of said cylindrical portions is subdivided into a plurality of longitudinal sections.

5. An installation according to claim 2, wherein each of said cylindrical portions is connected to the outer wall of the inner shell via longitudinal holding bars provided on either side of each of said cylindrical portion and via longitudinal beams fixed to said outer wall.

6. An installation according to claim 3, wherein said cylindrical portions are made of a temperature-resistant nickel alloy.

7. An installation according to claim 1, wherein the outer shell and the outer wall of the inner shell are made of steel.

8. An installation according to claim 1, wherein the downstream end of the outer wall of the inner shell tapers.

9. An installation according to claim 1, wherein the flared end portion of said outer shell is adapted to enable a cooling fluid to flow therethrough.

10. An installation according to claim 1, wherein said silencer associated with said device for funneling the jet of exhaust gases is movable relative to the engine.

11. An installation according to claim 1, wherein the upstream end of the silencer relative to the flow direction of the jet of exhaust gases from the engine has an air suction chimney, and in operation, the downstream portion of said funneling device is disposed beneath said chimney.

* * * * *